US012753901B2

(12) United States Patent
Hessling von Heimendahl et al.

(10) Patent No.: US 12,753,901 B2
(45) Date of Patent: Oct. 6, 2026

(54) AIRCRAFT TAIL NAVIGATION LIGHT, AIRCRAFT COMPRISING AN AIRCRAFT TAIL NAVIGATION LIGHT, AND METHOD OF OPERATING AN AIRCRAFT TAIL NAVIGATION LIGHT

(71) Applicant: Goodrich Lighting Systems GmbH & Co. KG, Lippstadt (DE)

(72) Inventors: Andre Hessling von Heimendahl, Koblenz (DE); Anil Kumar Jha, Lippstadt (DE); Benno Heissig, Geseke (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 19/296,429

(22) Filed: Aug. 11, 2025

(65) Prior Publication Data

US 2026/0049704 A1 Feb. 19, 2026

(30) Foreign Application Priority Data

Aug. 14, 2024 (EP) .................................... 24194485

(51) Int. Cl.
*F21S 43/00* (2018.01)
*B64D 47/06* (2006.01)
*F21S 43/20* (2018.01)

(52) U.S. Cl.
CPC ............ *F21S 43/601* (2024.05); *B64D 47/06* (2013.01); *F21S 43/255* (2018.01); *F21S 43/2605* (2024.05)

(58) Field of Classification Search
CPC .... F21S 43/601; F21S 43/255; F21S 43/2605; B64D 47/02; B64D 47/04; B64D 47/06; B64D 2203/00
See application file for complete search history.

(56) References Cited

U.S. PATENT DOCUMENTS 8,662,710 B2 * 3/2014 Sato .......................... F21V 7/28 362/297
8,742,435 B2 * 6/2014 Tanaka ...................... F21V 3/00 257/89
8,956,023 B1 * 2/2015 Hessling Von Heimendahl ......... B64D 47/02 362/470
9,635,739 B2 4/2017 Schoen et al.
10,919,644 B2 2/2021 Pawliczek et al.
11,161,625 B2 * 11/2021 Stoner .................... H05B 47/14
(Continued)

FOREIGN PATENT DOCUMENTS

EP 3812280 4/2021

OTHER PUBLICATIONS

European Patent Office, European Search Report dated Feb. 11, 2025 in Application No. 24194485.9.

*Primary Examiner* — Joseph L Williams
*Assistant Examiner* — Michael Chiang
(74) *Attorney, Agent, or Firm* — SNELL & WILMER L.L.P.

(57) ABSTRACT

An aircraft tail navigation light comprises: a navigation lighting assembly for emitting a regular navigation light output; and an orientation lighting assembly for emitting an orientation light output. The aircraft tail navigation light is switchable between emitting the regular navigation light output having a navigation light intensity and emitting the orientation light output having an orientation light intensity, with the navigation light intensity being larger than the orientation light intensity.

13 Claims, 7 Drawing Sheets

(56) References Cited

U.S. PATENT DOCUMENTS

| | | | | |
|---|---|---|---|---|
| 11,851,208 | B2 | 12/2023 | Depta et al. | |
| 11,975,866 | B2 | 5/2024 | Liu et al. | |
| 2018/0050820 | A1 * | 2/2018 | Jha .......................... | F21S 43/26 |
| 2020/0189766 | A1 | 6/2020 | Jha et al. | |

* cited by examiner

AIRCRAFT TAIL NAVIGATION LIGHT, AIRCRAFT COMPRISING AN AIRCRAFT TAIL NAVIGATION LIGHT, AND METHOD OF OPERATING AN AIRCRAFT TAIL NAVIGATION LIGHT

CROSS-REFERENCE TO RELATED APPLICATIONS

This application claims priority to EP Application Serial No. 24194485.9, filed Aug. 14, 2024 and titled "AIRCRAFT TAIL NAVIGATION LIGHT, AIRCRAFT COMPRISING AN AIRCRAFT TAIL NAVIGATION LIGHT, AND METHOD OF OPERATING AN AIRCRAFT TAIL NAVIGATION LIGHT," which is incorporated by reference herein in its entirety for all purposes

FIELD

The present invention is in the field of aircraft lighting, in particular in the field of exterior aircraft lighting. More particularly, the present invention is in the field of aircraft tail navigation lights, which are located at the tail of an aircraft. The present invention is further related to aircraft comprising an aircraft tail navigation light, and to a method of operating an aircraft tail navigation light.

BACKGROUND

Modern aircraft are equipped with a vast range of aircraft lights, including a variety of exterior aircraft lights, such as aircraft headlights, aircraft navigation lights, aircraft anti-collision lights, etc.

Some exterior aircraft lights, such as aircraft navigation lights and aircraft anti-collision lights, may be arranged at the tail of the aircraft for emitting light into an area behind the aircraft.

In order to make the aircraft visible over large distance in dark environments, aircraft navigation lights and aircraft anti-collision lights are configured for emitting light having a high intensity.

However, for example in case of aerial refueling at night, an aircraft tail navigation light located at the tail of a tanker aircraft may glare the pilot of a trailing aircraft, when approaching the leading tanker aircraft from behind for receiving fuel from the tanker aircraft via an in-flight fueling device. Glaring may result in eye fatigue and/or reduced dark adaption, which may negatively affect the pilots abilities to fly the trailing aircraft.

Accordingly, it would be beneficial to provide an improved aircraft tail navigation light that is capable to provide the basic functionalities of a conventional aircraft tail navigation light and that additionally allows a pilot of a trailing aircraft to safely approach and navigate with respect to a leading aircraft, in particular without being glared by the light output of the aircraft tail navigation light.

SUMMARY

Exemplary embodiments of the invention include an aircraft tail navigation light comprising a navigation lighting assembly configured for emitting a regular navigation light output, and an orientation lighting assembly configured for emitting an orientation light output. The aircraft tail navigation light is switchable between a navigation light mode, in which the aircraft tail navigation light emits the regular navigation light output having a navigation light intensity, and an orientation light mode, in which the aircraft tail navigation light emits the orientation light output having an orientation light intensity. The navigation light intensity of the regular navigation light output is larger than the orientation light intensity of the orientation light output.

Since operating an aircraft tail navigation light according to an exemplary embodiment of the invention in the orientation light mode is particularly helpful in situations, in which a trailing aircraft approaches a leading aircraft and is in close proximity to the leading aircraft, the orientation light output may also be denoted as proximity light output and the orientation lighting assembly may also be denoted as proximity lighting assembly.

The navigation light intensity may, for example, be in the range of between 20 cd and 100 cd; and the orientation light intensity may be below 20 cd, in particular below 15 cd, more particularly below 10 cd.

For comparison purposes, the intensities of the regular navigation light output and of the orientation light output may be evaluated along a line extending along a longitudinal axis of the leading aircraft. In other words, the intensities may be measured in a straight rearward direction from the aircraft tail navigation light. Alternatively, the intensities of the regular navigation light output and of the orientation light output may be determined in a cone centered on the longitudinal axis of the leading aircraft and opening into a rearward direction. Said cone may have such an opening angle that common refueling positions of trailing aircraft behind a tanker aircraft are encompassed. For example, said cone may have an opening angle of between 30° and 60°. The navigation light intensity of the regular navigation light output may be larger in all directions of said cone, as compared to the orientation light intensity of the orientation light output.

The intensities of the regular navigation light output and of the orientation light output may also be determined in a hemisphere, which is centered at the aircraft tail navigation light and which extends into the rearward direction of the aircraft.

When operated in the navigation light mode, an aircraft tail navigation light according to an exemplary embodiment of the invention may in particular emit a navigation light output that complies with the Federal Aviation Regulations (FAR), more particularly with sections 25.1385 to 25.1397 of the FAR, as in force on the filing date of the present application.

When operated in the orientation light mode, the aircraft tail navigation light according to an exemplary embodiment of the invention emits an orientation light output that has a lower intensity than the regular navigation light output. In particular, when operated in the orientation light mode, the aircraft tail navigation light emits an orientation light output that does not comply with sections 25.1385 to 25.1397 of the FAR.

Due to the lower light intensity of the orientation light output, exemplary embodiments of the invention may considerably reduce the risk of glaring a pilot of a trailing aircraft, when approaching a leading aircraft, which is equipped with an aircraft tail navigation light according to an exemplary embodiment of the invention. In consequence, the pilot of the trailing aircraft may navigate the trailing aircraft with respect to the leading aircraft in a particularly reliable manner and the pilot may securely approach the leading aircraft from behind, for example for coupling the trailing aircraft to an in-flight fueling device provided by the leading aircraft, in order to fuel the trailing aircraft with fuel from the leading aircraft. Also, with the lower light intensity of the orientation light output being less different from the dark environment during a nighttime refueling operation than the regular navigation light output, the eyes of the pilot of the trailing aircraft may maintain a better dark adaptation, and the pilot's overall awareness of the surroundings may be improved.

The regular navigation light output and the orientation light output may be white light outputs, in particular aviation white light outputs in accordance with the FAR.

An aircraft tail navigation light according to an exemplary embodiment of the invention does not require dimming of the regular navigation light output for reducing the light intensity. Adding the option of dimming the navigation light output of an aircraft tail navigation light would require a re-design and a re-qualification of the aircraft tail navigation light. Such re-design and re-qualification may be avoided by an aircraft tail navigation light according to an exemplary embodiment of the invention, i.e. by an aircraft tail navigation light having an orientation lighting assembly for emitting an orientation light output.

In consequence, the efforts and costs for providing an aircraft tail navigation light according to an exemplary embodiment of the invention may be lower in comparison with an aircraft tail navigation light that would enable dimming the regular navigation light output, in order to prevent glaring the pilot of a trailing aircraft.

An aircraft tail navigation light according to an exemplary embodiment of the invention may further avoid the use of filters for reducing the intensity of the light output. Filters are often susceptible to UV decomposition and temperature related aging. Accordingly, as compared to a hypothetical example of providing a reduced light intensity with the use of light filters, not having such filters may contribute to a high longevity of the aircraft tail navigation light.

An aircraft tail navigation light according to an exemplary embodiment of the invention may be switchable between the navigation light mode and the orientation light mode during flight. An aircraft tail navigation light may in particular be switched from the navigation light mode into the orientation light mode when a trailing aircraft approaches the leading aircraft from behind for being fueled from the leading aircraft; and the aircraft tail navigation light may be switched back into the navigation light mode after the fueling has been completed and the trailing aircraft has separated from the leading aircraft. Such switching between the navigation light mode and the orientation light mode during flight is a strong shift from previous operating regimes, where the regular navigation light output was provided throughout the whole flight. Providing the option of selectively and temporarily replacing the regular navigation light output with a lower light intensity orientation light output in flight may allow for an enhanced trade-off between large distance visibility in most flight situations and approach safety in re-fueling flight situations.

In an embodiment, the navigation light intensity is at least 5 times as large, in particular between 5 times and 50 times as large as the orientation light intensity. More particularly, the navigation light intensity may be between 5 times and 20 times as large as the orientation light intensity.

The navigation light intensity may, for example, be at least 5 times as large, at least 10 times as large, at least 20 times as large, at least 30 times as large, at least 40 times as large, or at least 50 times as large as the orientation light intensity. The navigation light intensity may, for example, be at most 150 times as large, in particular at most 100 times as large, further in particular at most 50 times as large as the orientation light intensity.

The above relations between the navigation light intensity and the orientation light intensity have been found to provide a good trade-off between a low risk of glaring the pilot of the trailing aircraft and a high chance of the pilot's eyes maintaining a good dark adaptation, while still providing a good level of conspicuity and allowing for good practical implementations of the aircraft tail navigation light.

When seen from a distance/at a distance from the aircraft tail navigation light, the navigation lighting assembly may have a navigation light output area, and the orientation lighting assembly may have an orientation light output area that is larger than the navigation light output area. In other words, when observed from a distance, the orientation light output may appear to stem from a larger light emitting area than the navigation light output.

The mentioned distance may in particular be a typical distance between the navigation lighting assembly and a pilot of a trailing aircraft during re-fueling/during an approach for re-fueling.

In particular, the orientation light output area may be seen as larger than the navigation light output area from a distance in a range of between 10 m and 100 m, more particularly from a distance in a range of between 10 m and 50 m, more particularly from a distance in a range of between 30 m and 50 m. For comparing the orientation light output area and the navigation light output area, an observer/a measurement device may be placed at said distance from the aircraft tail navigation light. From the position of said observer/measurement device, the orientation light output area and the navigation light output area may be determined in accordance with the lighting impression and basic geometric considerations. For carrying out the evaluation, a distance in the given range of between 10 m and 100 m, in particular in the range of between 30 m and 50 m, may be selected.

An orientation light output area that is larger than the navigation light output area may not be perceived as a point light source by the pilot of a trailing aircraft, but as an extended lit surface having extensions in the vertical and horizontal directions. Such an extended lit surface may allow the pilot of a trailing aircraft to perceive and judge the distance, and in particular changes of the distance, between the leading aircraft and the trailing aircraft, based on the perception of the orientation light output area, in particular based on the size of the orientation light output area perceived by the pilot.

Such an extended lit surface provides a very different perception to the pilot, as compared to the regular navigation light output. The light sources of conventional aircraft navigation lights usually comprise small light emitting areas. Even from relatively small distances, such as distances in the range of between 10 m and 30 m, conventional aircraft navigation lights are perceived as point light sources and, as such, are ill-suited to enable the pilot of a trailing aircraft to perceive and judge the distance between the trailing aircraft and the leading aircraft.

The perception of an extended lit surface may help the pilot of a trailing aircraft to approach a leading aircraft that is equipped with an aircraft tail navigation light according to an exemplary embodiment of the invention, for example for fueling the trailing aircraft. It may further reduce the risk of accidents, when approaching the leading aircraft with the trailing aircraft.

In an embodiment, the orientation light output area is at least 100 times as large as the navigation light output area. The orientation light output area may in particular be at most 3000 times as large as the navigation light output area, further in particular the orientation light output area may be between 100 and 3000 times as large as the navigation light output area.

The orientation light output area may in particular be at least 100, 200, 300, 400, 500, 600, 700, 800, 900, 1000, 1500, or 2000 times as large as the navigation light output area. The orientation light output area may in particular be at most 5000, 4000, 3000, 2000, or 1000 times as large as the navigation light output area.

Orientation light output areas having such large dimensions as compared to the navigation light output area may be reliably perceived as extended surfaces by the pilot of a trailing aircraft even from larger distances, thereby contributing to a safe navigation of the trailing aircraft with respect to the leading aircraft.

In an embodiment, the navigation lighting assembly comprises at least one navigation light source and an optical system. The optical system may be arranged over the at least one navigation light source for shaping the regular navigation light output from light that is emitted by the at least one navigation light source. It can also be said that the optical system may be arranged at the at least one navigation light source for shaping the regular navigation light output from light that is emitted by the at least one navigation light source. The optical system is provided, in order to provide a well-defined regular navigation light output; in particular a regular navigation light output that fulfills the requirements of the FAR.

In an embodiment, the optical system comprises at least one of a lens, a reflector or a shutter for shaping the regular navigation light output. The optical system may in particular comprise one or more lenses and/or one or more reflectors and/or one or more shutters.

In an embodiment, the orientation lighting assembly comprises at least one orientation light source and an orientation light output diluting element. The orientation light output diluting element may be arranged over the at least one orientation light source for shaping the orientation light output from light emitted by the at least one orientation light source. It can also be said that the orientation light output diluting element may be arranged at the at least one orientation light source for shaping the orientation light output from light emitted by the at least one orientation light source.

In an embodiment, the orientation light output diluting element comprises or is constituted by a light cap, which may be arranged over the at least one orientation light source.

Such a light cap may be a retrofittable component that can be arranged over at least one back-up light source of a conventional aircraft tail navigation light. In particular, the light cap may be configured for making a conventional aircraft tail navigation light, having redundant, spaced navigation light sources, into an aircraft tail navigation light according to an exemplary embodiment of the invention, which is capable to selectively output an orientation light output.

Such a modification may not even require a modification of the existing wiring of the aircraft tail navigation light, since the at least one back-up light source may be employed as the at least one orientation light source, using the existing wiring. This may considerably simplify the modification of a conventional aircraft tail navigation light, comprising at least one back-up light source, into an aircraft tail navigation light according to an exemplary invention.

The light cap may comprise a front portion which forms the orientation light output area.

In an embodiment, the orientation light output diluting element comprises a light sieve, with the light sieve comprising light blocking barrier portions and light passing portions.

The light blocking barrier portions may be opaque portions that completely block the light emitted by the at least one orientation light source, when incident on such light blocking barrier portions. Alternatively, the light blocking barrier portions may block a portion of the light emitted by the at least one orientation light source and may allow another portion of the light emitted by the at least one orientation light source to pass through, when incident on such light blocking barrier portions. The light blocking barrier portions may, for example, block between 70% and 90% of the light, as stemming from the at least one orientation light source and being incident on the light blocking barrier portions, and may allow between 10% and 30% of the light to pass through. The light blocking barrier portions may, in particular, block about 80% of the light, stemming from the at least one orientation light source and being incident on the light blocking barrier portions, and may allow 20% of the light to pass through.

In an embodiment, the orientation light output diluting element or the light sieve may be made of a material that is partly reflective and partly light transmissive for light, emitted by the at least one orientation light source and being incident on the orientation light output diluting element/the light sieve. The material may in particular be partly reflective and partly translucent. The material may, for example, be 80% reflective and 20% translucent. The light blocking barrier portions may be partly reflective and partly translucent for light emitted by the at least one orientation light source and incident on the light blocking barrier portions.

In an alternative embodiment, the orientation light output diluting element or the light sieve may be made of a material that is opaque and/or at least partly reflective for light emitted by the at least one orientation light source. The light blocking barrier portions may be opaque and/or at least partly reflective for light emitted by the at least one orientation light source.

According to an embodiment, at least the inside of the orientation light output diluting element is at least partly reflective for spreading the light, emitted by the at least one orientation light source. In this way, when hitting light blocking barrier portions, the light from the at least one orientation light source may not be lost, but may be available for one or more instances of reflection in the space between the at least one orientation light source and the orientation light output diluting element. Said reflected light may contribute to the orientation light output with different angles, as compared to the light coming directly from the at least one orientation light source. This may in turn contribute to a high level of uniformity in the orientation light output and/or to the provision of an extended orientation light output area. The at least partly reflective nature of the orientation light output diluting element may thus provide for a good starting point for fine tuning the light output of the orientation light output diluting element to luminance uniformity by varying the number and sizes of the openings or transparent inserts.

The orientation light output diluting element/the light cap may be made from standard, non-optical materials that are inexpensive and that are not sensitive to harsh environmental conditions, such as heat, UV radiation or other stresses to which an aircraft tail navigation light may be exposed in operation.

The orientation light output diluting element/the light cap may be made, for example, from Ultem 9085 or other engineering plastics such as PES or PA. The material may be selected depending on the temperatures to which the aircraft tail navigation light may be exposed in operation.

The orientation light output diluting element/the light cap may be a single, integrally formed element, which may be manufactured by 3D printing. Other production methods, such as injection molding, may be employed for producing the orientation light output diluting element/the light cap as well.

In an embodiment, the light passing portions include openings or transparent inserts that allow light emitted by the at least one orientation light source to pass through.

The openings or transparent inserts may have a cylindrical shape. In particular, the openings or transparent inserts may have a cylindrical shape with a circular cross-section. The openings or transparent inserts may in particular have diameters in the range of between 0.4 mm and 4 mm.

Adjusting the sizes of the openings or transparent inserts may allow for fine tuning the homogeneity of the light output provided by orientation light output diluting element.

In an embodiment, the distance between adjacent light passing portions is less than 5 mm. The distance between adjacent light passing portions may in particular be less than 4.5 mm, more particularly, the distance between adjacent light passing portions may be less than 4.3 mm. The distance between adjacent light passing portions may be at least 1 mm, in particular at least 2 mm.

The light passing portions may not be perceived as individual light passing portions, when they are arranged at distances that are smaller than the resolution of the retina, which is about 1/60 of a degree. At a distance of 15 m or more from the aircraft tail navigation light, the individual light passing portions are not perceivable as individual light passing portions and the orientation light output area may be perceived as a single, highly homogenous light emitting surface, if the spacing between the light passing portions is less than 4.3 mm.

In an embodiment, the light passing portions are arranged in a pattern. A projection of the at least one orientation light source onto said pattern may be located at a center portion of the pattern. Arranging the at least one orientation light source below a center portion of the pattern may result in a highly uniform illumination of the light passing portions of the pattern.

In an embodiment, light passing portions that are located at a greater distance from the center portion of the pattern may be larger than light passing portions that are arranged closer to the center portion of the pattern. This may allow for at least partially compensating for a lower intensity of the light impinging onto the portions that are located in a greater distance from the at least one orientation light source. This may help to generate an orientation light output that is highly homogeneous.

In an embodiment, the pattern includes multiple annular or circular arrangements of light passing portions. The multiple annular or circular arrangements of light passing portions may be arranged coaxially around the center portion of the pattern.

In an alternative embodiment, the pattern may include a rectangular matrix arrangement of light passing portions, in particular a quadratic matrix arrangement of light passing portions.

In an embodiment, the orientation light output diluting element, in particular the light sieve of the orientation light output diluting element, has a light emission surface area of at least 100 $mm^2$, in particular a light emission surface area of at least 200 $mm^2$, of at least 300 $mm^2$, of at least 400 $mm^2$, of at least 500 $mm^2$, of at least 600 $mm^2$, of at least 700 $mm^2$, of at least 800 $mm^2$, of at least 900 $mm^2$, or of at least 1000 $mm^2$.

In an embodiment, the orientation light output diluting element, in particular the light sieve of the orientation light output diluting element, has an extension or diameter of at least 10 mm, in particular an extension or diameter of between 30 mm and 70 mm, further in particular an extension or diameter of between 40 mm and 60 mm.

An orientation light output diluting element, in particular a light sieve, having such dimensions may allow for providing an orientation light output that may be perceived by the pilot of a trailing aircraft as an extended lit surface. Such an extended lit surface may allow the pilot to judge the distance of the trailing aircraft from the aircraft tail navigation light of the leading aircraft in an improved manner.

In an embodiment, the at least one navigation light source and the at least one orientation light source may be at least one navigation LED and at least one orientation light LED.

The at least one navigation light source and the at least one orientation light source may have light output areas that do not exceed 2 $mm^2$, respectively. The light output areas of the at least one navigation light source and the at least one orientation light source may, in particular, not exceed 1 $mm^2$.

The at least one navigation light source and the at least one orientation light source may be of identical design. The at least one navigation light source and the at least one orientation light source may in particular be of a design of a tail navigation light with redundant light sources.

This may allow for retrofitting/reconfiguring of existing aircraft tail navigation lights with redundant navigation lighting functionality.

In an embodiment, the at least one navigation light source and the at least one orientation light source are white light sources, in particular white LEDs.

The at least one navigation light source and the at least one orientation light source may be switchable independently of each other.

Exemplary embodiments of the invention further include an aircraft, such as an airplane or a helicopter, comprising an aircraft tail navigation light according to an exemplary embodiment of the invention.

Exemplary embodiments of the invention also include a method of operating an aircraft tail navigation light according to an exemplary embodiment of the invention, wherein the method includes selectively operating the aircraft tail navigation light in a regular navigation light mode or in an orientation light mode. When the aircraft tail navigation light is operated in the regular navigation light mode, the navigation lighting assembly is activated, providing the regular navigation light output, and the orientation lighting assembly is deactivated. When the aircraft tail navigation light is operated in the orientation light mode, the navigation lighting assembly is deactivated, and the orientation lighting assembly is activated, providing the orientation light output.

The additional features, modifications and effects that have been described with respect to an aircraft tail navigation light according to exemplary embodiments of the invention apply to an aircraft comprising an aircraft tail navigation light according to an exemplary embodiment of the invention and to a method of operating an aircraft tail navigation light according to an exemplary embodiment of the invention in an analogous manner.

BRIEF DESCRIPTION OF THE DRAWINGS

Further exemplary embodiments of the invention are described in the following with respect to the accompanying drawings, wherein.

DETAILED DESCRIPTION

Figure 1:
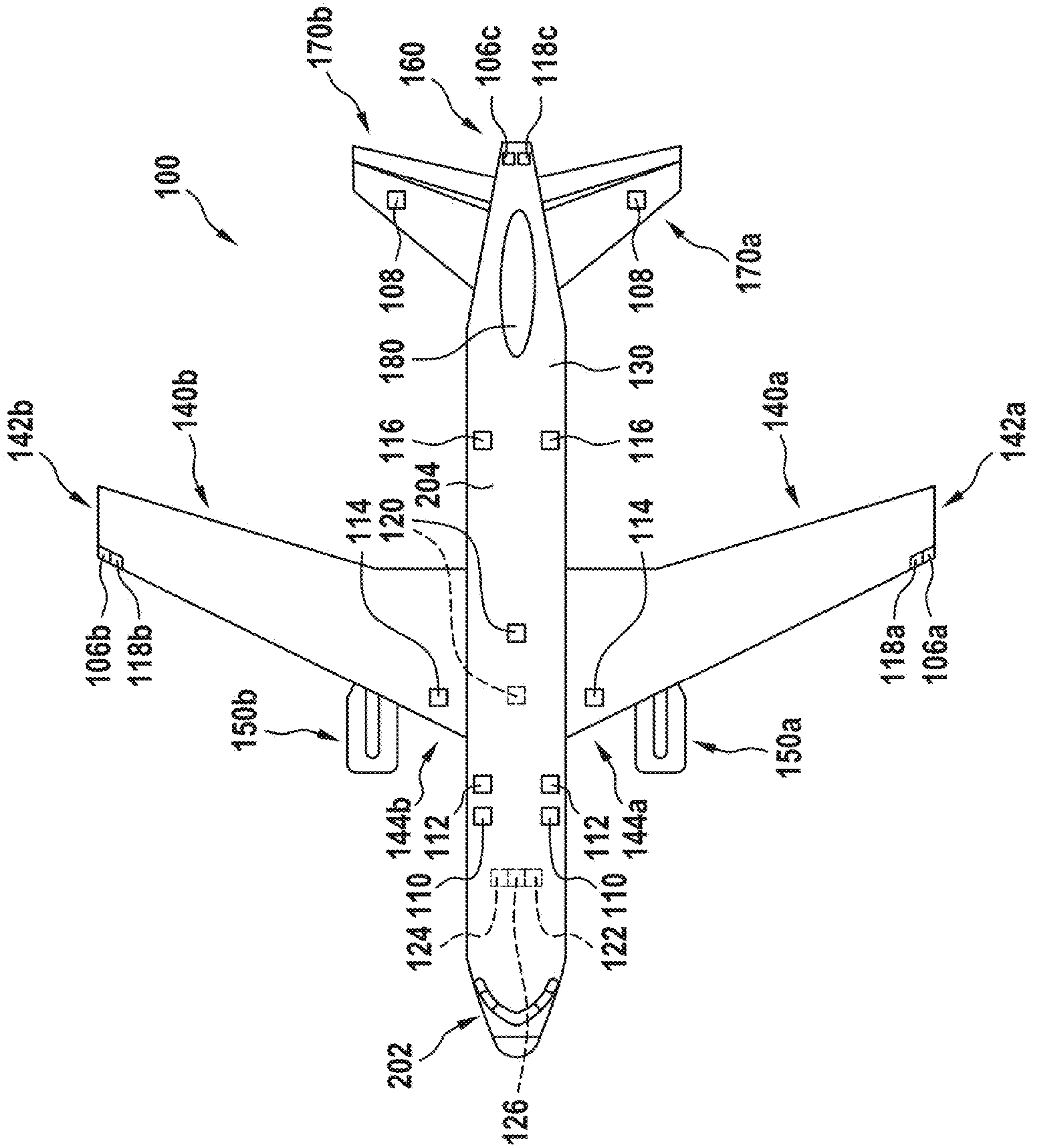
FIG. 1 depicts a schematic top view of an aircraft according to an exemplary embodiment of the invention, which is equipped with a variety of exterior aircraft lights.

FIG. 1 shows a schematic top view of an aircraft 100 according to an exemplary embodiment of the invention. The aircraft 100 is an airplane, comprising a fuselage 130, which houses a cockpit 202 and a passenger cabin 204, and two wings 140*a*, 140*b*, extending from the fuselage 130. Two horizontal stabilizers 170*a*, 170*b* and a vertical stabilizer 180 extend from a rear portion of the fuselage 130. A respective engine 150*a*, 150*b* is mounted to each of the wings 140*a*, 140*b*.

The aircraft 100 depicted in FIG. 1 is equipped with a wide variety of exterior lights. In particular, the aircraft 100 is equipped with three navigation lights 106*a*-106*c*, two logo lights 108, two wing scan lights 110, two engine scan lights 112, two runway turn-off lights 114, two cargo loading lights 116, three white strobe anti-collision lights 118*a*-118*c*, two red-flashing anti-collision beacon lights 120, a landing light 122, a take-off light 124, and a taxi light 126. It is pointed out that these kinds of lights and their numbers are exemplary only and that the aircraft 100 may be equipped with additional lights that are not shown in FIG. 1.

A port side navigation light 106*a*, emitting light having red color, is arranged at the wing tip 142*a* of the left wing 140*a*. A starboard navigation light 106*b*, emitting light having green color, is arranged at the wing tip 142*b* of the right wing 140*b*. A tail navigation light 106*c*, emitting light having white color, is positioned at the tail 160 of the aircraft 100.

The different colors of the light outputs, as emitted by the different navigation lights 106*a*-106*c*, indicate to the aircraft environment if they are looking at the port side, at the starboard side or at the tail side of the aircraft 100. Traditionally, the navigation lights 106*a*-106*c* are normally activated during all phases of the flight and in all flight conditions.

The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144*a*, 144*b* of the wings 140*a*, 140*b* of the aircraft 100. The wing scan lights 110 and the engine scan lights 112 are normally off during the flight and may be switched on periodically or upon reasonable cause by the pilots or by the aircrew, in order to check the wings 140*a*, 140*b* and the engines 150*a*, 150*b* of the aircraft 100.

The runway turn-off lights 114 are positioned in the roots 144*a*, 144*b* of the wings 140*a*, 140*b*. The runway turn-off lights 114 are directed forwards and are normally switched off during the flight and switched on during taxiing, at least at night.

The cargo loading lights 116 are positioned on the left and right sides of the fuselage 130, behind the wings 140*a*, 140*b* and in front of the tail structure of the aircraft 100. They are normally switched off during the flight of the aircraft 100.

A white wing strobe anti-collision light 118*a*-118*b* is positioned in the left and right wing tip 142*a*, 142*b*, respectively. A white tail strobe anti-collision light 118*c* is positioned at the tail 160 of the aircraft 100. During normal operation of the aircraft 100, the white strobe anti-collision lights 118*a*-118*b* emit respective sequences of white light flashes. It is also possible that the white strobe anti-collision lights 118*a*-118*b* are only operated during night and in bad weather conditions.

The red-flashing anti-collision beacon lights 120 are positioned on the top and the bottom of the fuselage 130 of the aircraft 100. They are arranged at the height of the wings in the longitudinal direction of the aircraft 100. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1. The red-flashing anti-collision beacon lights 120 are normally switched on during taxiing and during take-off and landing. Their output is perceived as a sequence of red light flashes in a given viewing direction. In alternative configurations, three red-flashing anti-collision beacon lights may be provided alongside or integrated with the white strobe anti-collision lights 118*a*-118*b*.

In the embodiment depicted in FIG. 1, the runway turn-off lights 114 are located in the wings 140*a*, 140*b*, in particular in the roots 144*a*, 144*b* of the wings 140*a*, 140*b*, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140*a*, 140*b*, in particular in the roots 144*a*, 144*b* of the wings 140*a*, 140*b*, of the aircraft 100.

The aircraft 100 may also comprise one or more multifunctional lights, which combine(s) the functionalities of at least two of a landing light, a take-off light, a taxi light, a runway turn-off light, a navigation light, a white strobe anti-collision light, and a red-flashing beacon light.

Since the landing light 122, the take-off light 124, and the taxi light 126 are arranged on the bottom of the aircraft 100, they are also depicted in phantom in FIG. 1.

In the exemplary embodiment of FIG. 1, the tail navigation light 106*c* is an aircraft tail light in accordance with an exemplary embodiment of the invention. It is also possible that a combined aircraft tail light in accordance with an exemplary embodiment of the invention is provided at the tail of the aircraft 100, with the combined aircraft tail light providing the functionalities of the tail navigation light 106*c* and the tail anti-collision light 118*c*. Having an aircraft tail light in accordance with an exemplary embodiment of the invention, the aircraft 100 is an aircraft in accordance with an exemplary embodiment of the invention.

Figure 2:
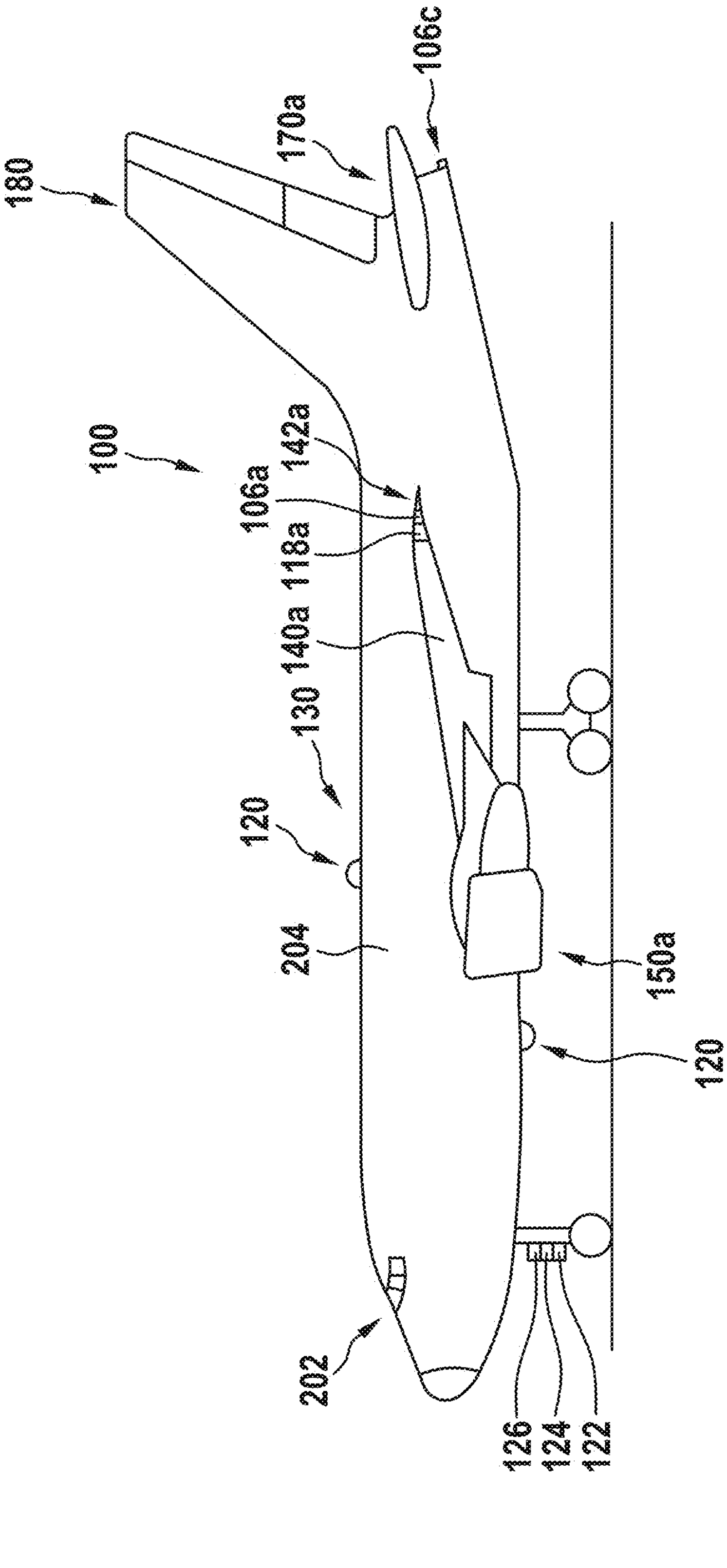
FIG. 2 depicts a schematic side view of an aircraft according to an exemplary embodiment of the invention, which is equipped with an aircraft tail navigation light in accordance with an exemplary embodiment of the invention.

FIG. 2 shows a schematic side view of an aircraft 100 according to an exemplary embodiment of the invention, as it is depicted in FIG. 1. In order to enhance the clarity of the illustration, only the aircraft tail navigation light 106*c* is depicted at the tail of the aircraft 100 of FIG. 2. The aircraft 100 may comprise at least one additional aircraft tail light, which is not depicted in FIG. 2.

Figure 3:
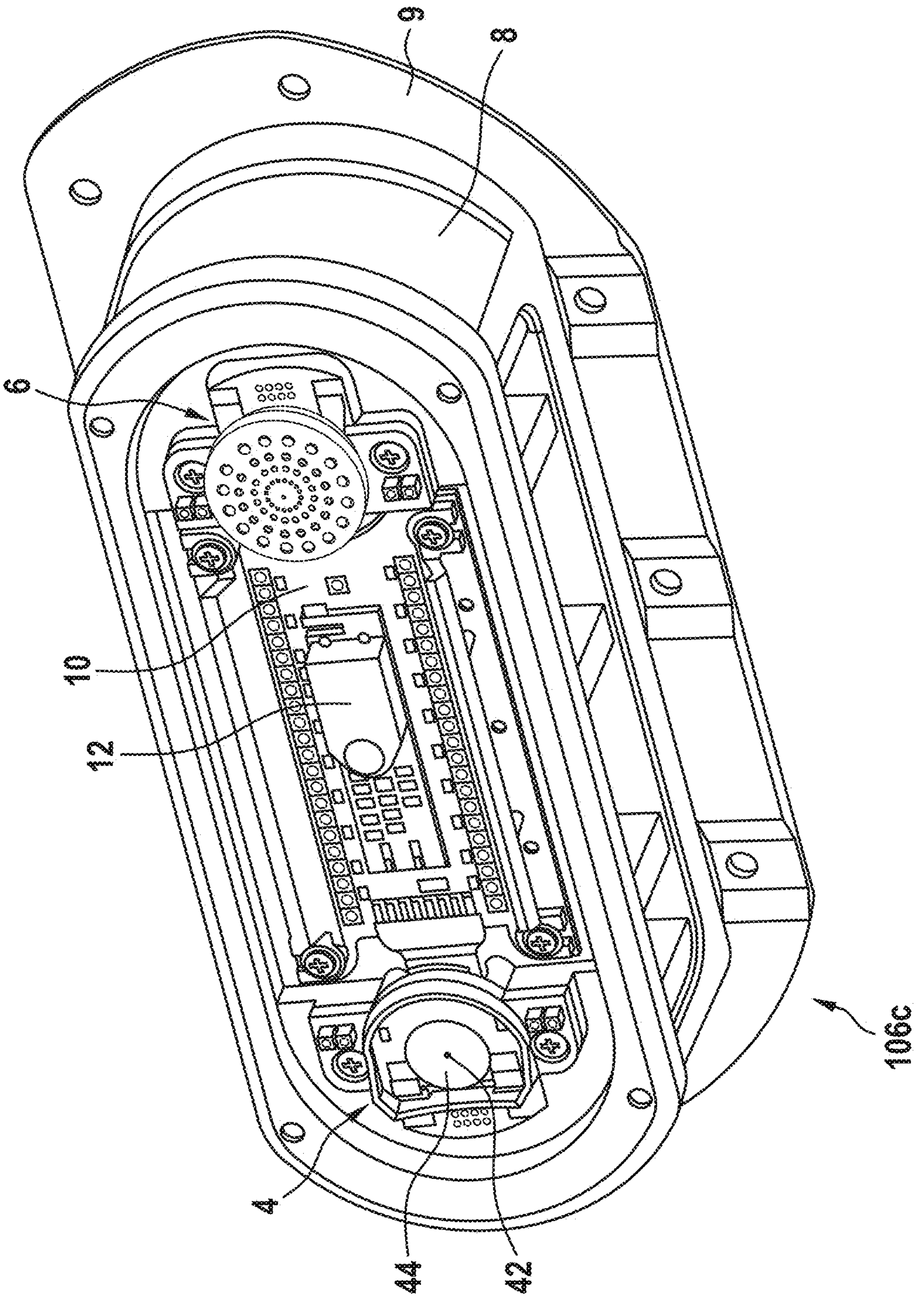
FIG. 3 shows a perspective view of an aircraft tail navigation light according to an exemplary embodiment of the invention.

FIG. 3 shows a perspective view of an aircraft tail navigation light 106*c* according to an exemplary embodiment of the invention.

The aircraft tail navigation light 106*c* comprises a navigation lighting assembly 4 for emitting a regular navigation light output, and an orientation lighting assembly 6 for emitting an orientation light output. The navigation lighting assembly 4 and the orientation lighting assembly 6 are spaced in a transverse direction of the aircraft tail navigation light 106*c*, i.e. in a transverse direction in the aircraft frame of reference, when the aircraft tail navigation light 106*c* is mounted to an aircraft.

In the embodiment depicted in FIG. 3, the navigation lighting assembly 4 is located on a left side/portside of the aircraft tail navigation light 106*c*, and the orientation lighting assembly 6 is located on a right side/starboard side of the aircraft tail navigation light 106*c*. This is, however, only an exemplary configuration, and exemplary embodiments of the invention may include different configurations, such as configurations in which the orientation lighting assembly 6 is located on the left side of the navigation lighting assembly 4. In further embodiments, the orientation lighting assembly 6 may be located on top of or below the navigation lighting assembly 4.

The aircraft tail navigation light 106*c* further comprises a circuit board 10, extending between the navigation lighting assembly 4 and the orientation lighting assembly 6 and supporting electric circuitry 12.

The navigation lighting assembly 4, the orientation lighting assembly 6, and the circuit board 10 are located in a common housing 8. The housing 8 comprises a surrounding flange 9, which allows for mounting the housing 8 to the fuselage 130 of an aircraft 100.

In operation, a light transmissive cover 14 (see FIG. 4), which is not shown in FIG. 3, covers the navigation lighting assembly 4, the orientation lighting assembly 6, and the circuit board 10.

The orientation lighting assembly 6 comprises at least one orientation light source 62 and an orientation light output diluting element 64. The orientation light output diluting element 64 is arranged over the at least one orientation light source 62 for shaping the orientation light output from light emitted by the at least one orientation light source 62.

The navigation lighting assembly 4 comprises at least one navigation light source 42 and an optical system 44. The optical system 44 is arranged over the at least one navigation light source 42 for shaping the regular navigation light output from light emitted by the at least one navigation light source 42.

The optical system 44 may, for example, comprise at least one of a lens, a reflector and a shutter for shaping the regular navigation light output from light emitted by the at least one navigation light source 42. In the exemplary embodiment of FIG. 3, the optical system 44 consists of a single lens.

The at least one navigation light source 42 and the optical system 44 may be mounted to and supported by the circuit board 10.

Figure 4:
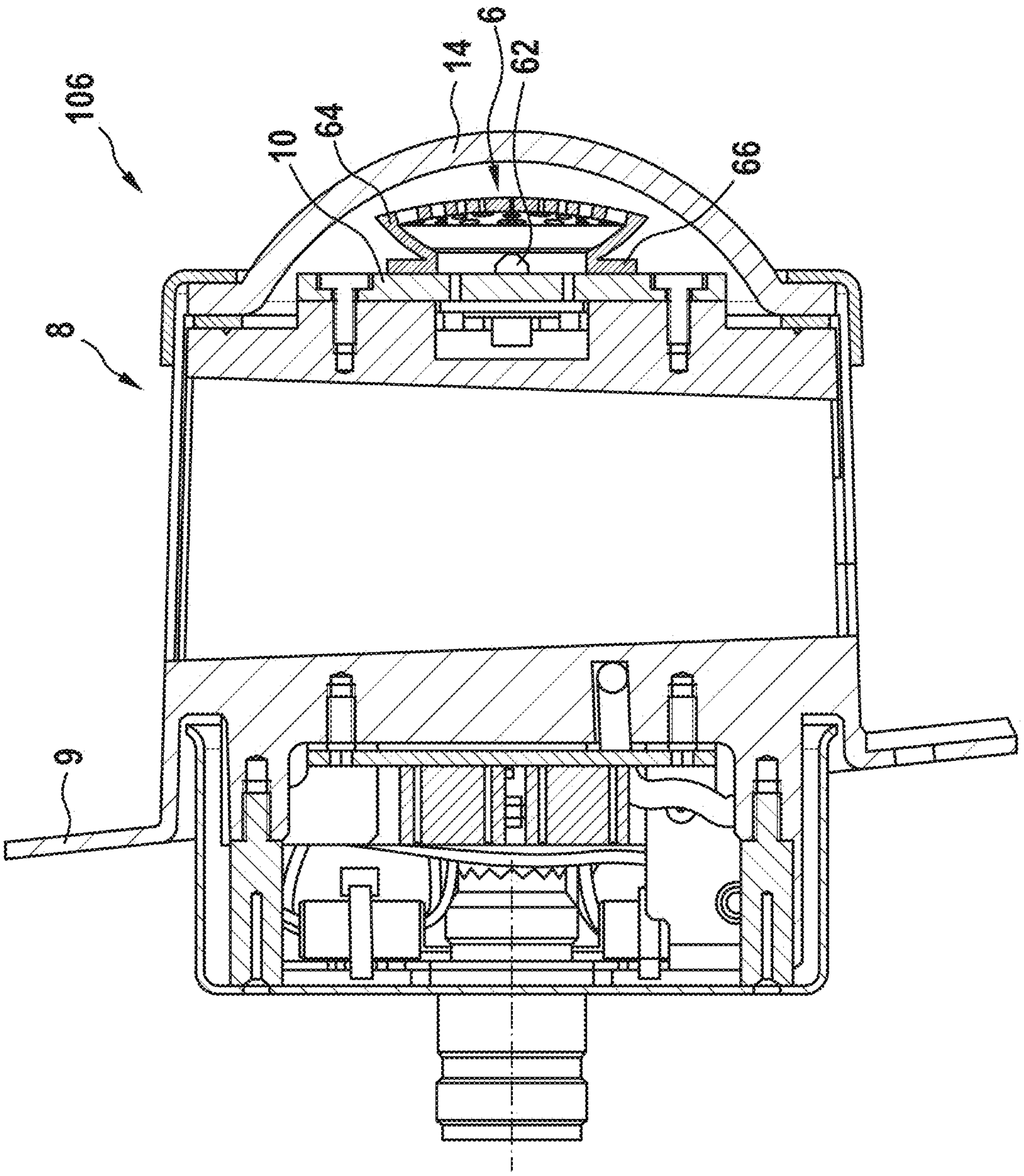
FIG. 4 shows a cross-sectional view of the aircraft tail navigation light depicted in FIG. 3, with the cross-sectional plane extending through the orientation lighting assembly.

FIG. 4 shows a cross-sectional view of the aircraft tail navigation light 106*c* depicted in FIG. 3, with the cross-sectional plane extending through the orientation lighting assembly 6. In particular, the cross-sectional plane may extend orthogonal to the circuit board 10 and/or may be a vertical cross-sectional plane in the aircraft frame of reference that is substantially aligned with the longitudinal direction of the aircraft. Accordingly, the rearward direction of the aircraft is towards the right in the drawing plane of FIG. 4.

The light transmissive cover 14 covers the navigation lighting assembly 4, not shown in FIG. 4, and the orientation lighting assembly 6.

The orientation lighting assembly 6 comprises at least one orientation light source 62 and an orientation light output diluting element 64, which is arranged over the at least one orientation light source 62 for shaping the orientation light output from light emitted by the at least one orientation light source 62.

The at least one orientation light source 62 and the orientation light output diluting element 64 may be mounted to and supported by the circuit board 10.

The at least one navigation light source 42 and the at least one orientation light source 62 may be LEDs, respectively.

The at least one navigation light source 42 and the at least one orientation light source 62 may have light output areas that do not exceed 2 $mm^2$, respectively. The light output areas of the at least one navigation light source 42 and the at least one orientation light source 62 may, in particular, not exceed 1 $mm^2$.

The at least one navigation light source 42 and the at least one orientation light source 62 may be switchable independently of each other. The tail navigation light 106*c* may in particular be switchable between a navigation light mode, in which the at least one navigation light source 42 is activated for emitting a navigation light output, and an orientation light mode, in which the at least one navigation light source 42 is deactivated and the at least one orientation light source 62 is activated for emitting an orientation light output. When the tail navigation light 106*c* is operated in the navigation light mode, the at least one orientation light source 62 is usually deactivated, but it may also be activated.

The at least one navigation light source 42 and at least one orientation light source 62 may be of identical design. The light sources 42, 62 may, in particular, be of a design of a conventional tail navigation light comprising redundant light sources. This may allow for retrofitting/reconfiguring existing aircraft tail navigation lights, which have redundant navigation lighting functionality, to aircraft tail navigation lights 106*c* according to exemplary embodiments of the invention, which are selectively operable in a navigation light mode and in an orientation light mode.

Figure 5:
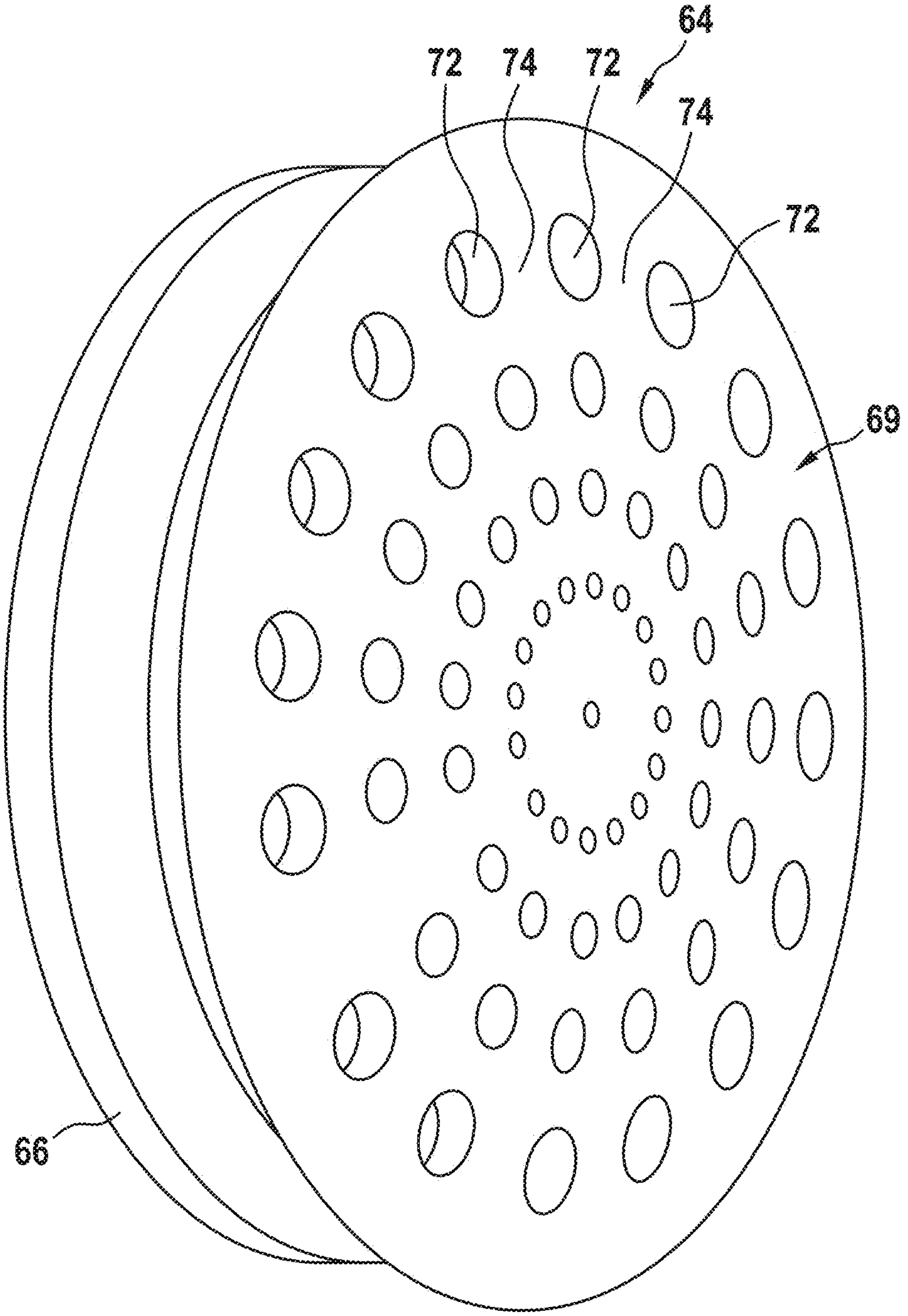
FIG. 5 depicts a perspective view of an orientation light output diluting element of an aircraft tail navigation light according to an exemplary embodiment of the invention.
Figure 6:
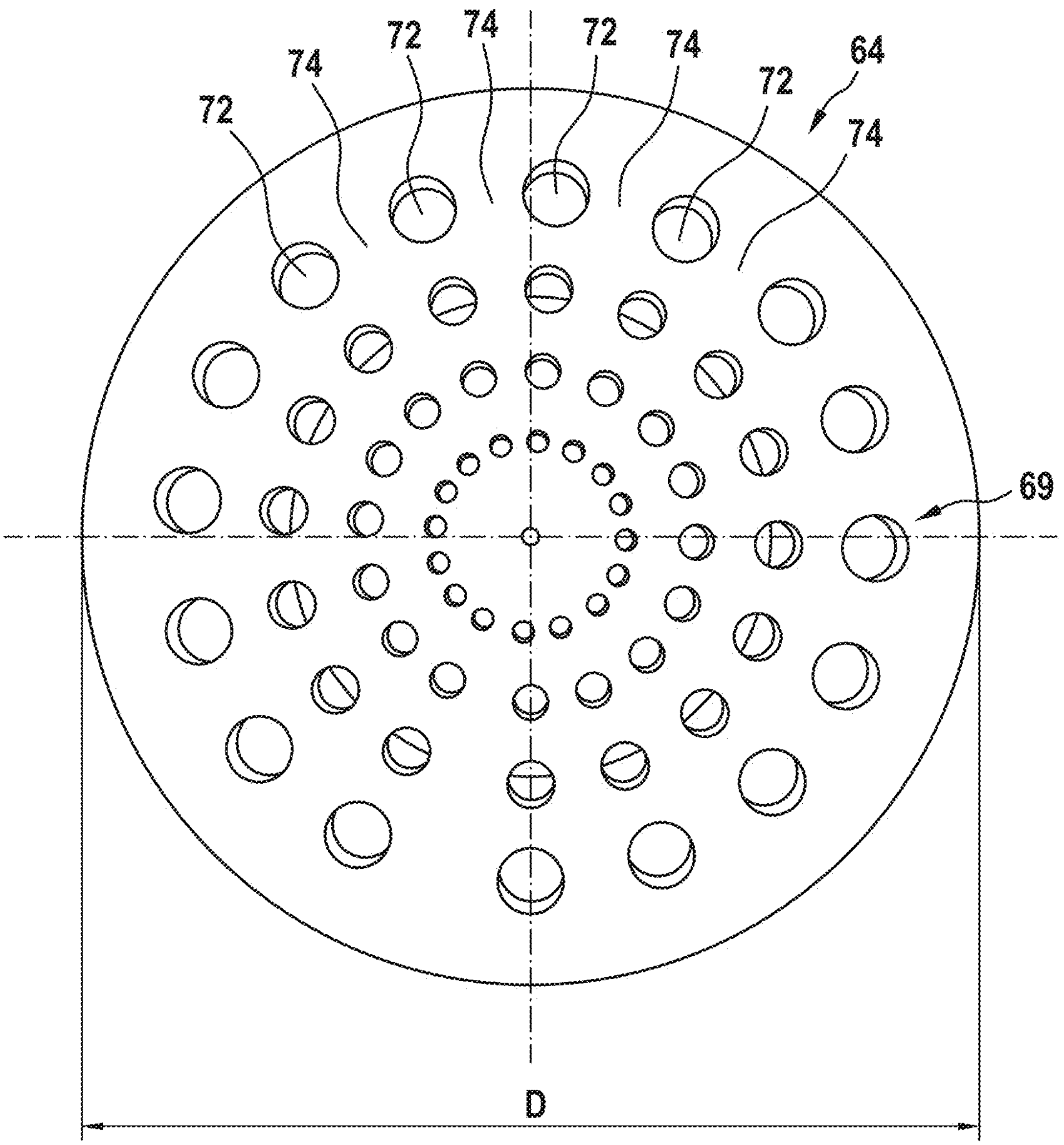
FIG. 6 depicts a plan view of the orientation light output diluting element depicted in FIG. 5.

FIG. 5 depicts a perspective view of an orientation light output diluting element 64 of an aircraft tail navigation light according to an exemplary embodiment of the invention. FIG. 6 depicts a plan view of the orientation light output diluting element 64, as depicted in FIG. 5, and FIG. 7 depicts a cross-sectional view of the orientation light output diluting element 64, as depicted in FIGS. 5 and 6.

Figure 7:
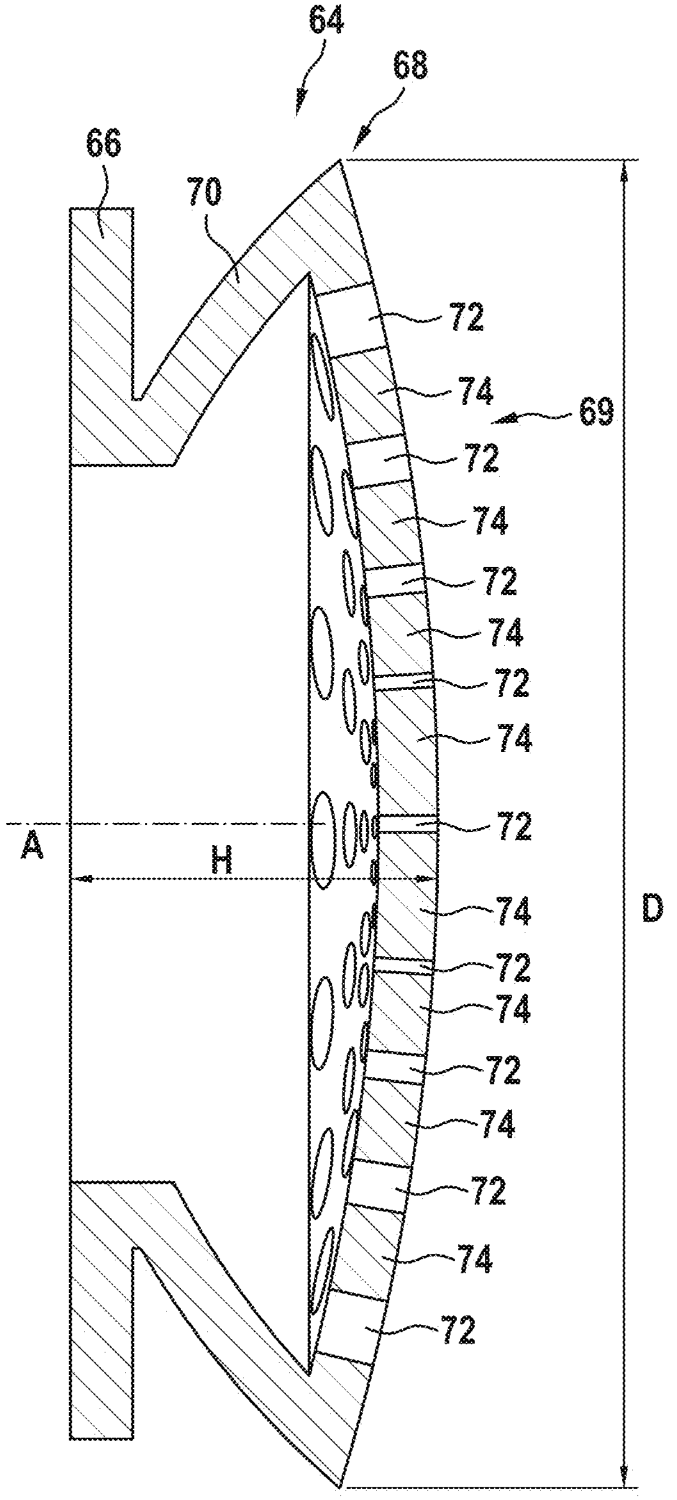
FIG. 7 depicts a cross-sectional view of the orientation light output diluting element depicted in FIGS. 5 and 6.

The exemplary embodiment of an orientation light output diluting element 64, as depicted in FIGS. 5 to 7, is provided as a light cap, which is rotationally symmetric with respect to an axis A. This orientation light output diluting element 64 may be employed in an aircraft tail navigation light in accordance with an exemplary embodiment of the invention, as for example depicted in FIG. 3 and/or FIG. 4.

The orientation light output diluting element 64 comprises a base portion 66, having a circular shape around the axis A and configured to be mounted to the circuit board 10, as for example depicted in FIG. 4.

When the orientation light output diluting element 64 is mounted to the circuit board 10, the base portion 66 surrounds the at least one orientation light source 62, which may be located in a central part of the base portion 66 on or close to the axis A, as for example depicted in FIG. 4.

The orientation light output diluting element 64 further comprises a front portion 68. When the orientation light output diluting element 64 is mounted to the circuit board 10, its front portion 68 is spaced from the circuit board 10 and the at least one orientation light source 62, as it is depicted in FIG. 4.

The orientation light output diluting element 64 comprises a support portion 70 extending between the base portion 66 and the front portion 68 for supporting the front portion 68.

The support portion 70 has rotational symmetry with respect to the axis A as well. The support portion 70 may have a curved shape, as it is exemplarily depicted in FIGS. 5 to 7. The support portion 70 may in particular be formed similar to a cup, with a narrow portion having a first diameter at an end facing the base portion 66 and with a wide portion having a second diameter at the front portion 68, wherein the second diameter is larger than the first diameter.

The front portion 68 of the orientation light output diluting element 64 may be or may include a light sieve 69, comprising light passing portions 72 and light blocking barrier portions 74.

For clarity of illustration, only some of the light passing portions 72 and only some of the light blocking barrier portions 74 are exemplarily denoted with reference signs in FIGS. 5 and 6.

The light blocking barrier portions 74 are formed by the material of the front portion 68 between the light passing portions 72. The light passing portions 72 are formed by openings through the front portion 68 of the orientation light output diluting element 64.

The material forming the front portion 68 of the orientation light output diluting element 64 may be partly reflective and partly translucent for the light emitted by the at least one orientation light source 62. In such a configuration, the light blocking barrier portions 74 are partly reflective and partly translucent for light emitted by the at least one orientation light source 62.

In an alternative embodiment, the material forming the front portion 68 of the orientation light output diluting element 64 may be opaque and at least partly reflective for the light emitted by the at least one orientation light source 62, so that the light blocking barrier portions 74 are opaque and at least partly reflective for light emitted by the at least one orientation light source 62.

In the exemplary embodiment of FIGS. 5 to 7, at least the inside of the orientation light output diluting element 64 is at least partly reflective for spreading the light emitted by the at least one orientation light source 64. The resulting set of light rays within the chamber underneath orientation light output diluting element 64 may form the basis for fine tuning the light output of the orientation light output diluting element 64 by varying the numbers and sizes of the light passing portions 72 and light blocking barrier portions 74. In this way, a high level of luminance uniformity across the orientation light output diluting element 64 may be achieved.

The orientation light output diluting element 64 be made from standard, non-optical materials that are inexpensive and that are not sensitive to harsh environmental conditions, such as heat, UV radiation or other stresses to which an aircraft tail navigation light may be exposed in operation.

The orientation light output diluting element 64 may in particular be made from a non-UV sensitive material, such as Ultem 9085 or another engineering plastics such as PES, or PA.

The base portion 66, the front portion 68 and the support portion 70 may be made from the same material. The base portion 66, the front portion 68 and the support portion 70 may in particular be formed integrally with each other, providing an integrated orientation light output diluting element 64. The orientation light output diluting element 64 may be provided in the form of a light cap that can be placed over the at least one orientation light source 62.

The integrated orientation light output diluting element 64/the light cap may be manufactured by 3D printing, injection molding or another suitable production method.

In the embodiment depicted in FIGS. 5 to 7, the light passing portions 72 are provided as openings 72 formed in the front portion 68 of the orientation light output diluting element 64.

The openings 72 are in particular arranged as annular arrangements along multiple concentric circles, which have different radii and which are centered on axis A.

In the exemplary embodiment depicted in FIGS. 5 to 7, the openings 72 are arranged in four annular arrangements along four circles, with all circles comprising the same number of openings 72. This is, however, only an exemplary configuration, and the openings may be provided in other configurations as well.

The openings 72 may, for example, be arranged along circles comprising different numbers of openings 72. The openings 72 may also be arranged in different patterns, for example in a rectangular or honeycomb pattern.

Additionally, a central opening, which is not part of any of the four annular arrangements, may be formed at the center of the front portion 68.

In the exemplary embodiment depicted in FIGS. 5 to 7, the diameter of the openings 72 increases with increasing distance from the axis A. In other words, the openings 72 of an outer circle of openings 72 having a first radius have a larger diameter than the openings 72 of an inner circle of openings 72 having a second radius that is smaller than the first radius. The different diameters of the openings 72 may compensate for a lower intensity of the light emitted by the at least one orientation light source 62 that reaches the outer regions of the front portion 68 of the orientation light output diluting element 64, as compared to the light emitted by the at least one orientation light source 62 that reaches the inner regions of the front portion 68. Such a configuration of the openings 72 may allow for generating a highly homogeneous orientation light output.

The openings 72 may have diameters in the range in the range of between 0.4 mm and 4 mm. The largest openings 72, which are located at the outer periphery of the front portion 68, may have diameters in the range in the range of between 2.5 mm and 4 mm. The smallest openings 72, which are located in a central part of the front portion 68, may have diameters in the range in the range of between 0.4 mm and 1.5 mm.

The front portion 68 of the orientation light output diluting element 64 may have an extension, in particular a diameter, D of at least 10 mm. The front portion 68 of the orientation light output diluting element 64 may in particular have an extension, in particular a diameter, D of between 30 mm and 70 mm, further in particular an extension, in particular a diameter, D of between 40 mm and 60 mm.

The orientation light output diluting element 64 may have a height H (see FIG. 7) in the range of between 10 mm and 20 mm.

The closest distance between adjacent openings 72 may be less than 5 mm. The closest distance between adjacent openings 72 may in particular be less than 4.5 mm, more particularly the closest distance between adjacent openings 72 may be less than 4.3 mm.

In an alternative embodiment, which is not shown explicitly in the figures, the light passing portions 72 may be provided by a transparent or nearly transparent material that allows a large portion of the light emitted by the at least one orientation light source 62 to pass through.

The transparent or nearly transparent material may by provided in the form of inserts and may be introduced into the openings 72 that are formed in the front portion 68 of the orientation light output diluting element 64.

Alternatively, the front portion 68 of the orientation light output diluting element 64 may be formed integrally to comprise highly light transmissive light passing portions 72 and to comprise at least partly reflective, and potentially fully opaque, light blocking barrier portions 74.

The front portion 68 of the orientation light output diluting element 64 may, for example, be formed from a transparent material, and the light blocking barrier portions 74 may be formed by applying an at least partly reflective, and potentially fully opaque, coating to selected portions of the front portion 68 of the orientation light output diluting element 64. This coating may be applied to the inside or to the outside of the front portion 68 of the orientation light output diluting element 64.

The front portion 68 of the orientation light output diluting element 64 with the light passing portions 72 may provide a light emission surface of the orientation lighting assembly 6 that has a light emission surface area of at least 500 $mm^2$, in particular a light emission surface area more than least 1000 $mm^2$.

In contrast, the area of the light emission surface of the navigation lighting assembly 4, which is provided by the at least one navigation light source 42/by the combination of the at least one navigation light source 42 and the optical system 44 arranged over the at least one navigation light source 42, may be smaller than 5 $mm^2$, in particular smaller than 2 $mm^2$.

As a result, when viewed from a certain distance, in particular from a distance of more than 10 m, from the aircraft tail navigation light 106*c*, the light emitted by the navigation lighting assembly 4 is perceived as a point source. In contrast, the light emitted by the orientation lighting assembly 6 is perceived as an illuminated area having an extension in the horizontal direction and in the vertical direction, respectively. The horizontal and vertical extension of the illuminated area provides a visual reference that allows a pilot of a trailing aircraft, flying behind the aircraft 100 that is equipped with an aircraft tail navigation light 106*c* according to an exemplary embodiment of the invention, to evaluate the distance between the trailing aircraft and the leading aircraft 100 based on the perceived illuminated area.

Further, since the light emitted by the orientation lighting assembly 6 has a considerably lower light intensity than the light emitted by a conventional aircraft tail navigation light 106*c*, the risk of glaring the pilot of the trailing aircraft and the resulting risks of eye fatigue and reduced dark adaption of the pilot's eyes are considerably reduced. In consequence, it is easier for the pilot of the trailing aircraft to safely navigate the trailing aircraft behind the leading aircraft 100, in particular for receiving fuel from the leading aircraft 100 via an in-flight fueling device provided by the leading aircraft 100.

In aircraft tail navigation lights according to exemplary embodiments of the invention, the navigation light intensity may be at least 10 times as large, in particular between 10 times and 100 times as large, as the orientation light intensity. The difference in light intensity may stem from different intrinsic intensities of the at least one navigation light source and the at least one orientation light source or from different ways of driving/supplying current to the at least one navigation light source and the at least one orientation light source. It is also possible that the light intensities, as emitted by the at least one navigation light source and the at least one orientation light source, are substantially the same or similar and that the difference in light intensities of the navigation light output and the orientation light output stems from the optical effect of the orientation light output diluting element.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft tail navigation light, comprising:
- a navigation lighting assembly for emitting a regular navigation light output; and
- an orientation lighting assembly for emitting an orientation light output;
- wherein the aircraft tail navigation light is switchable between emitting the regular navigation light output having a navigation light intensity and emitting the orientation light output having an orientation light intensity;
- wherein the navigation light intensity is larger than the orientation light intensity;
- wherein the orientation lighting assembly comprises at least one orientation light source and an orientation light output diluting element, which is arranged over the at least one orientation light source for shaping the orientation light output from light emitted by the at least one orientation light source;
- wherein the orientation light output diluting element comprises a light sieve, and
- wherein the light sieve comprises light blocking barrier portions and light passing portions.

2. The aircraft tail navigation light according to claim 1, wherein the navigation light intensity is at least 5 times as large.

3. The aircraft tail navigation light according to claim 1, wherein the navigation lighting assembly has a navigation light output area and the orientation lighting assembly has an orientation light output area, as seen from a distance from the aircraft tail navigation light; and wherein the orientation light output area is larger than the navigation light output area.

4. The aircraft tail navigation light according to claim 3, wherein the orientation light output area is at least 100 times as large as the navigation light output area.

5. The aircraft tail navigation light according to claim 1, wherein the navigation lighting assembly comprises at least one navigation light source and an optical system, which is arranged over the at least one navigation light source for shaping the regular navigation light output from light emitted by the at least one navigation light source; and wherein the optical system comprises a lens for shaping the regular navigation light output.

6. The aircraft tail navigation light according to claim 1, wherein the light sieve is made of a material that is partly reflective and partly translucent for light emitted by the at least one orientation light source; or wherein the light blocking barrier portions of the light sieve are partly reflective and partly translucent for light emitted by the at least one orientation light source.

7. The aircraft tail navigation light according to claim 1, wherein the light passing portions include openings or transparent inserts that allow light emitted by the at least one orientation light source to pass through the light sieve.

8. The aircraft tail navigation light according to claim 1, wherein the light passing portions are arranged in a pattern; and wherein a projection of the at least one orientation light source onto the pattern is located at a center portion of the pattern.

9. The aircraft tail navigation light according to claim 8, wherein the light passing portions located at a greater distance from the center portion of the pattern are larger than the light passing portions arranged closer to the center portion of the pattern.

10. The aircraft tail navigation light according to claim 8, wherein the pattern includes multiple annular arrangements of light passing portions; or wherein the pattern includes a rectangular matrix arrangement of light passing portions; or wherein the pattern includes a quadratic matrix arrangement of light passing portions.

11. The aircraft tail navigation light according to claim 1, wherein the orientation light output diluting element has a light emission surface area of at least 100 $mm^2$; or wherein the orientation light output diluting element, in particular the light sieve thereof, has an extension of at least 10 mm.

12. An aircraft, such as an airplane or a helicopter, comprising the aircraft tail navigation light according to claim 1.

13. A method of operating the aircraft tail navigation light according to claim 1, wherein the method includes selectively operating the aircraft tail navigation light in a regular navigation light mode or in an orientation light mode;

wherein, when the aircraft tail navigation light is operated in the regular navigation light mode, the navigation lighting assembly is activated, providing the regular navigation light output, and the orientation lighting assembly is deactivated; and wherein, when the aircraft tail navigation light is operated in the orientation light mode, the navigation lighting assembly is deactivated, and the orientation lighting assembly is activated, providing the orientation light output.

* * * * *